United States Patent
Brown et al.

(10) Patent No.: US 11,664,680 B2
(45) Date of Patent: *May 30, 2023

(54) METHOD AND SYSTEM FOR POWER SUPPLY CONTROL

(71) Applicant: NICOR, INC., Albuquerque, NM (US)

(72) Inventors: David M. Brown, Rio Rancho, NM (US); Trevor Shaw, Albuquerque, NM (US); Jorge A. Gomez Martinez, Albuquerque, NM (US)

(73) Assignee: NICOR, INC., Albuquerque, NM (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/030,086

(22) Filed: Sep. 23, 2020

(65) Prior Publication Data
US 2021/0004230 A1    Jan. 7, 2021

Related U.S. Application Data

(62) Division of application No. 16/169,856, filed on Oct. 24, 2018, now Pat. No. 10,824,427.

(Continued)

(51) Int. Cl.
| | |
|---|---|
| *H02J 13/00* | (2006.01) |
| *G06F 9/30* | (2018.01) |
| *G06F 1/26* | (2006.01) |
| *G06F 1/16* | (2006.01) |
| *G05B 15/02* | (2006.01) |
| *H02J 1/06* | (2006.01) |

(Continued)

(52) U.S. Cl.
CPC ........ *H02J 13/00017* (2020.01); *G05B 15/02* (2013.01); *G06F 1/1684* (2013.01); *G06F 1/266* (2013.01); *G06F 9/30083* (2013.01); *H02J 1/06* (2013.01); *H02J 1/14* (2013.01); *H02J 13/00004* (2020.01); *H02J 5/00* (2013.01)

(58) Field of Classification Search
CPC .... G06F 9/30083; G06F 1/1684; G06F 1/266; G05B 15/02
USPC .......................................................... 713/300
See application file for complete search history.

(56) References Cited

U.S. PATENT DOCUMENTS

| | | | | |
|---|---|---|---|---|
| 4,157,461 A | * | 6/1979 | Wiktor | H01H 9/26 307/64 |
| 4,194,147 A | * | 3/1980 | Payne | H02M 3/10 323/272 |

(Continued)

FOREIGN PATENT DOCUMENTS

WO    2013126965 A1    9/2013

OTHER PUBLICATIONS 500677 installation instructions Legrand Wattstopper (Year: 2016).*

(Continued)

*Primary Examiner* — Paul R. Myers
(74) *Attorney, Agent, or Firm* — Loza & Loza LLP; Kevin L. Soules (57) ABSTRACT

A system and apparatus comprise at least one power supply connected to a terminal bloc, an I/O system configured to receive instructions provided to the control system, a control block connected to the I/O system wherein the instructions provided to the I/O system are converted to a serial output; and a puck connected to the serial output and configured to receive power from the terminal block, to process the serial output, and to output a current.

12 Claims, 9 Drawing Sheets

Legend
100 Computer system
400 Power supply and control system
405 Case
410 Rail
415 Power Supply
416 Power Supply
420 Fan
421 Fan
425 Filter
426 Filter
430 Control header
431 Control header
435 Terminal Block
440 Wire
441 Wire
442 Wire
443 Wire
445 Output
450 I/O System
451 Input cable
452 Mains power input
455 Control system
460 I/O block
465 Power supply
470 Switch
475 Surge protector

Related U.S. Application Data (60) Provisional application No. 62/764,678, filed on Aug. 15, 2018, provisional application No. 62/668,642, filed on May 8, 2018, provisional application No. 62/576,877, filed on Oct. 25, 2017.

(51) Int. Cl.
*H02J 1/14* (2006.01)
*H02J 5/00* (2016.01)

(56) References Cited

U.S. PATENT DOCUMENTS

| | | | |
|---|---|---|---|
| 4,392,187 | A | 7/1983 | Bornhorst |
| 5,003,227 | A | 3/1991 | Nilssen |
| 5,357,170 | A | 10/1994 | Luchaco et al. |
| 5,359,540 | A * | 10/1994 | Ortiz ............... H02J 13/00012 307/115 |
| 5,420,482 | A | 5/1995 | Phares |
| 5,475,360 | A | 12/1995 | Guidette et al. |
| 5,631,811 | A * | 5/1997 | Huh ................... H02M 3/335 363/21.04 |
| 5,963,843 | A * | 10/1999 | Sit ....................... H03F 1/526 725/144 |
| 6,175,201 | B1 | 1/2001 | Sid |
| 6,388,399 | B1 | 5/2002 | Eckel et al. |
| 6,400,103 | B1 | 6/2002 | Adamson |
| 6,545,860 | B1 * | 4/2003 | Pierce ................... H02B 1/305 174/59 |
| 6,548,967 | B1 | 4/2003 | Dowling et al. |
| 6,680,586 | B1 * | 1/2004 | Chen ................. H05B 47/155 340/332 |
| 6,967,565 | B2 | 11/2005 | Lingemann |
| 7,259,528 | B2 | 8/2007 | Pilz |
| 7,599,171 | B1 * | 10/2009 | Remmert ............. H02J 9/062 307/64 |
| 9,164,557 | B1 * | 10/2015 | Marr ...................... G06F 1/28 |
| 9,831,649 | B1 * | 11/2017 | Gretz ................. H02G 3/0683 |
| 10,824,427 | B2 * | 11/2020 | Brown .................... H02J 1/06 |
| 11,183,843 | B1 * | 11/2021 | Cooper ................... H02J 3/32 |
| 2002/0145394 | A1 | 10/2002 | Morgan et al. |
| 2003/0011538 | A1 | 1/2003 | Lys et al. |
| 2003/0036807 | A1 | 2/2003 | Fosler |
| 2003/0057890 | A1 | 3/2003 | Lys et al. |
| 2004/0122930 | A1 | 6/2004 | Pasternak |
| 2005/0035717 | A1 | 2/2005 | Adamson et al. |
| 2005/0213352 | A1 | 11/2005 | Lys |
| 2005/0248299 | A1 | 11/2005 | Chemel et al. |
| 2005/0253533 | A1 * | 11/2005 | Lys ..................... F21V 23/003 315/291 |
| 2006/0071605 | A1 | 4/2006 | Diederiks |
| 2006/0125426 | A1 | 6/2006 | Veskovic et al. |
| 2006/0187081 | A1 | 8/2006 | Gloisten et al. |
| 2007/0018783 | A1 | 1/2007 | Erhardt |
| 2007/0222284 | A1 * | 9/2007 | Matsubara ............. B60T 17/18 303/122.04 |
| 2007/0247134 | A1 * | 10/2007 | Ryan ................ H02J 13/00018 323/318 |
| 2008/0136334 | A1 | 6/2008 | Robinson et al. |
| 2008/0215279 | A1 | 9/2008 | Salsbury et al. |
| 2008/0265799 | A1 | 10/2008 | Sibert |
| 2009/0058191 | A1 * | 3/2009 | Nordman ................. H02G 3/08 307/112 |
| 2009/0102396 | A1 | 4/2009 | Petrucci et al. |
| 2011/0131455 | A1 | 6/2011 | Law et al. |
| 2011/0248835 | A1 | 10/2011 | Speegle et al. |
| 2013/0085615 | A1 * | 4/2013 | Barker ................... A61G 10/00 700/277 |
| 2013/0099573 | A1 * | 4/2013 | Nakajima ............... H02J 7/345 307/64 |
| 2013/0111123 | A1 * | 5/2013 | Thayer ................. G06F 13/385 711/105 |
| 2015/0008844 | A1 | 1/2015 | Wilson |
| 2015/0115807 | A1 | 4/2015 | Schroder et al. |
| 2015/0130368 | A1 | 5/2015 | Harbers |
| 2016/0278230 | A1 | 9/2016 | Mielnik et al. |
| 2016/0349721 | A1 * | 12/2016 | Kang ...................... G05F 1/66 |

OTHER PUBLICATIONS

International Search Report for International Application No. PCT/US18/57391, dated Jan. 4, 2019, 2 pages.

International Written Opinion for International Application No. PCT/US18/57391, dated Jan. 4, 2019, 7 pages.

* cited by examiner

Legend

900 Control system
905 Barrier
910 Jacks
915 Voltage switch
920 PCB
925 Jack for cold aisle normal power
930 Jack for hot aisle normal power
935 Control unit
940 Network Bridge
945 Terminal block
946 Mains power 950 Terminal block
951 Mains power
955 Driver
960 Driver
965 Terminal block
970 Terminal block
975 Surge protector
980 Controller
985 Barrier
990 Remote application
995 Ethernet cable

FIG. 9

METHOD AND SYSTEM FOR POWER SUPPLY CONTROL

CROSS REFERENCE TO RELATED PATENT APPLICATIONS

This patent application is a divisional of U.S. patent application Ser. No. 16/169,856, titled, "METHOD AND SYSTEM FOR POWER SUPPLY CONTROL" which was filed on Oct. 24, 2018.

U.S. patent application Ser. No. 16/169,856 and this patent application, claim the priority and benefit under 35 U.S.C. § 119(e) of U.S. Provisional Patent Application Ser. No. 62/576,877 filed Oct. 25, 2017, entitled "LUMINAIRE POWER BANK." U.S. Provisional Patent Application Ser. No. 62/576,877 is herein incorporated by reference in its entirety.

U.S. patent application Ser. No. 16/169,856, and this patent application also claim the priority and benefit under 35 U.S.C. § 119(e) of U.S. Provisional Patent Application Ser. No. 62/668,642 filed May 8, 2018, entitled "METHOD AND SYSTEM FOR POWER SUPPLY CONTROL." U.S. Provisional Patent Application Ser. No. 62/668,642 is herein incorporated by reference in its entirety.

U.S. patent application Ser. No. 16/169,856, and this patent application also claim the priority and benefit under 35 U.S.C. § 119(e) of U.S. Provisional Patent Application Ser. No. 62/764,678 filed Aug. 15, 2018, entitled "METHOD AND SYSTEM FOR POWER SUPPLY CONTROL." U.S. Provisional Patent Application Ser. No. 62/764,678 is herein incorporated by reference in its entirety.

TECHNICAL FIELD

Embodiments are generally related to the field of power systems. Embodiments are also related to the field of lighting. Embodiments are further related to the field of control systems. Embodiments are also related to the field of power and control systems for lighting. Embodiments are also related to methods, systems, and devices for bulk power supply systems with individual mode control capability.

BACKGROUND

In typical lighting environments, it is common to have an arrangement of individual power lines and control lines servicing each light. An exemplary case, is an LED lighting configuration in a warehouse, where a large number of lights require both control and power. Prior art approaches require that each LED light be serviced by a unique power supply and dedicated control lines. This approach makes it very difficult to manage the lighting system because each light must be serviced individually.

Accordingly, there is a need in the art for methods and systems that provide bulk control of power supplied to one or more applications, such as commercial, residential, industrial, and warehouse lighting systems.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide lighting systems and methods.

It is another aspect of the disclosed embodiments to provide control systems and methods.

It is another aspect of the disclosed embodiments to provide power systems and methods.

It is another aspect of the disclosed embodiments to provide power control systems and methods.

It is another aspect of the disclosed embodiments to convert incoming AC power into low voltage DC power, in order to serve power to, and control, multiple downline applications.

It is another aspect of the disclosed embodiments to provide systems and methods for providing power to, and control of, lighting systems.

It is another aspect of the disclosed embodiments to provide methods, systems, and devices for bulk power supply systems with individual mode control capability. For example, in the embodiments disclosed herein a method and system include at least one power supply connected to a terminal block, an I/O system configured to receive instructions provided to the control system, a control block connected to the I/O system wherein the instructions provided to the I/O system are converted to a serial output, and a puck connected to the serial output and configured to receive power from the terminal block, to process the serial output, and to output a current. The at least one power supply can comprise a plurality of power supplies, wherein power that is output from each of the plurality of power supplies is summed at the terminal block. The plurality of power supplies can comprise a total power from 0 Watts to 4000 Watts.

In certain embodiments, the I/O system is configured to operate according to BACnet/IP protocol. The control block is configured to operate according to DALI protocol. In certain embodiments an independent power supply can be configured to provide power to the I/O system and the control block.

The system can further comprise a housing and a rail configured in the housing, the rail configured to hold the I/O system and the control block. The system can further comprise an output cable, the output cable further comprising a power line, a power return line, a first output associated with the serial output and a second output associated with the serial output. In certain embodiments a luminaire can be connected to the puck. In other embodiments a plurality of luminaires can be connected wherein each of the luminaires is connected to an associated puck.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in the following non-limiting examples can be varied and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, Aft AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 1:
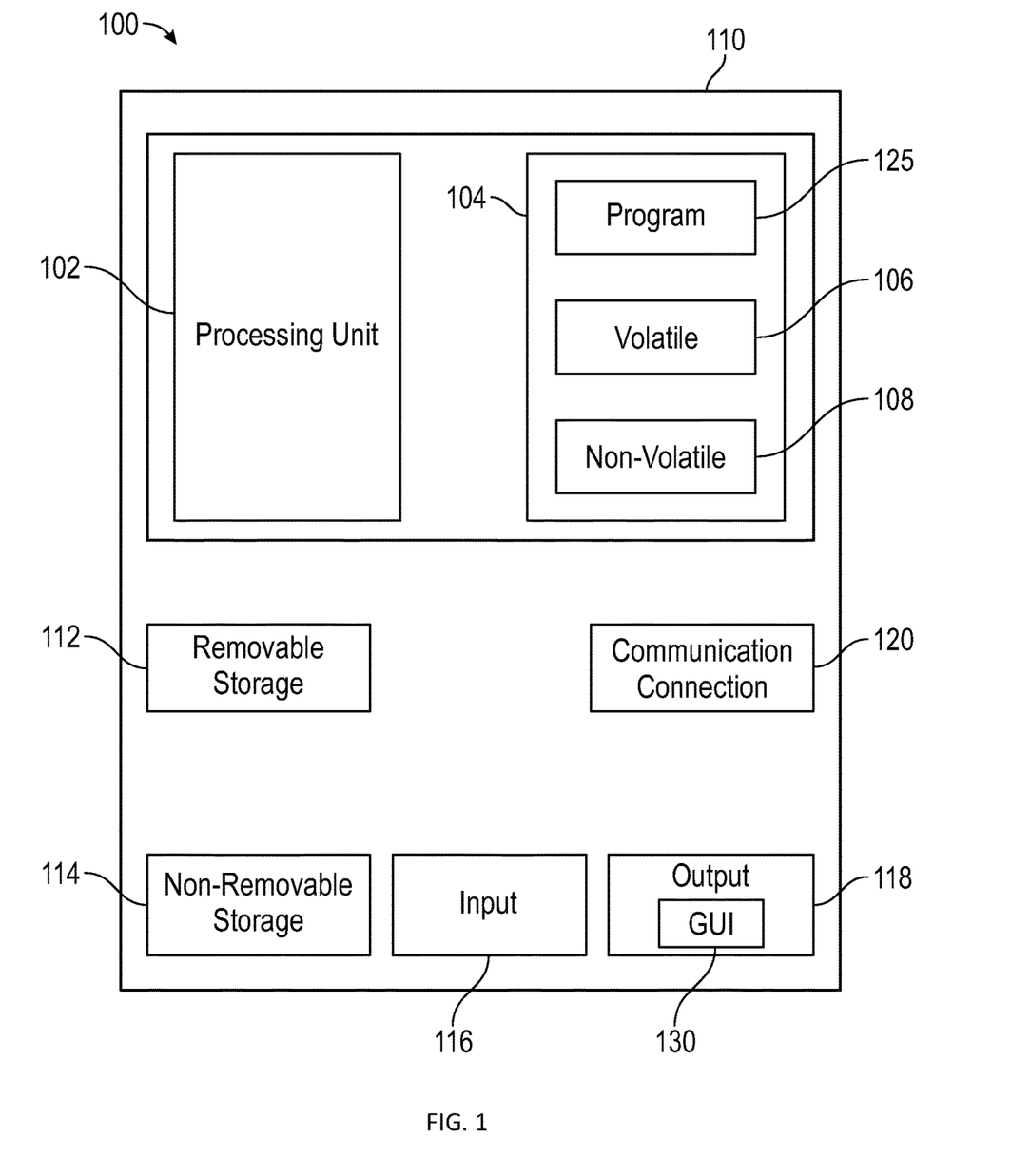
FIG. 1 depicts a block diagram of a computer system which is implemented in accordance with the disclosed embodiments.
Figure 2:
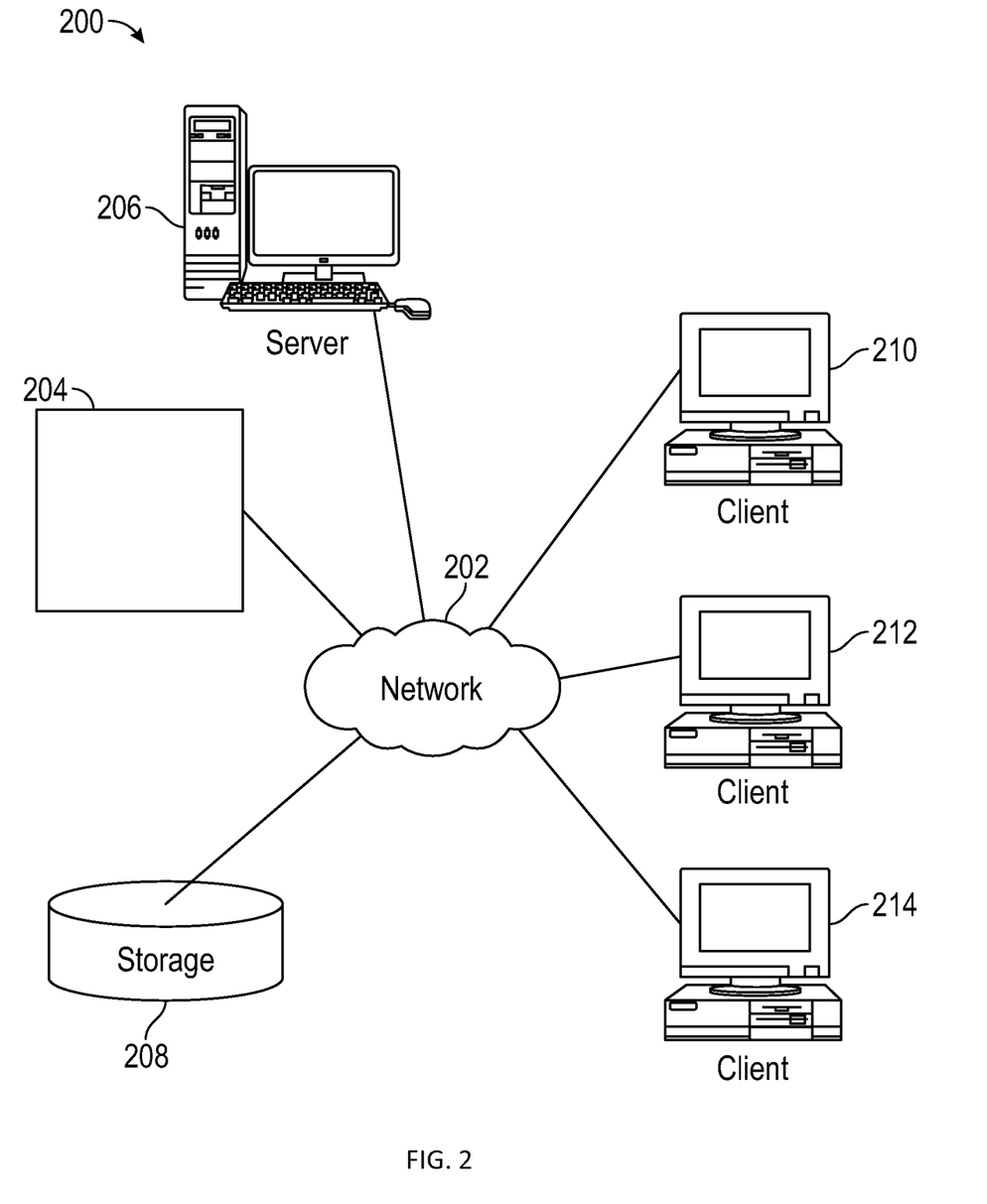
FIG. 2 depicts a graphical representation of a network of data-processing devices in which aspects of the present embodiments may be implemented.
Figure 3:
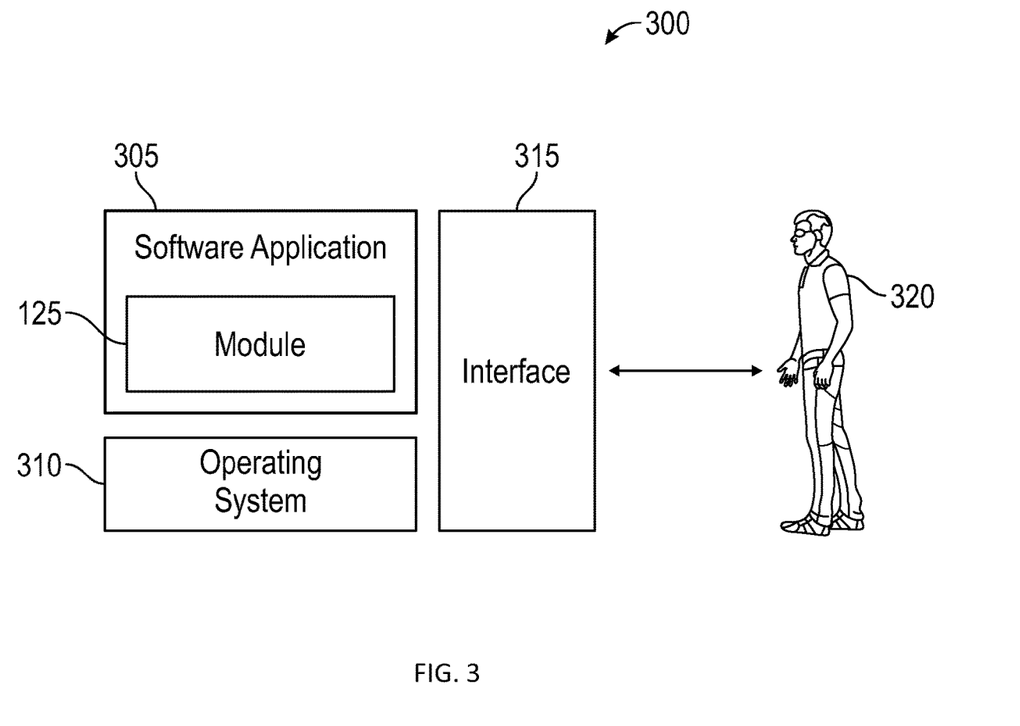
FIG. 3 illustrates a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, handheld devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smart phones, sensors, controllers, speakers, tactile devices, and the like, in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, one or more external devices such as device 204, and a memory storage unit such as, for example, memory or database 208. It should be understood that device 204 may be embodied as a control system as disclosed herein.

In the depicted example, device 204, server 206, and clients 210, 212, and 214 connect to network 202 along with storage unit 208. Clients 210, 212, and 214 may be, for example, personal computers or network computers, handheld devices, mobile devices, tablet devices, smart phones, personal digital assistants, printing devices, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1.

Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

Figure 4:
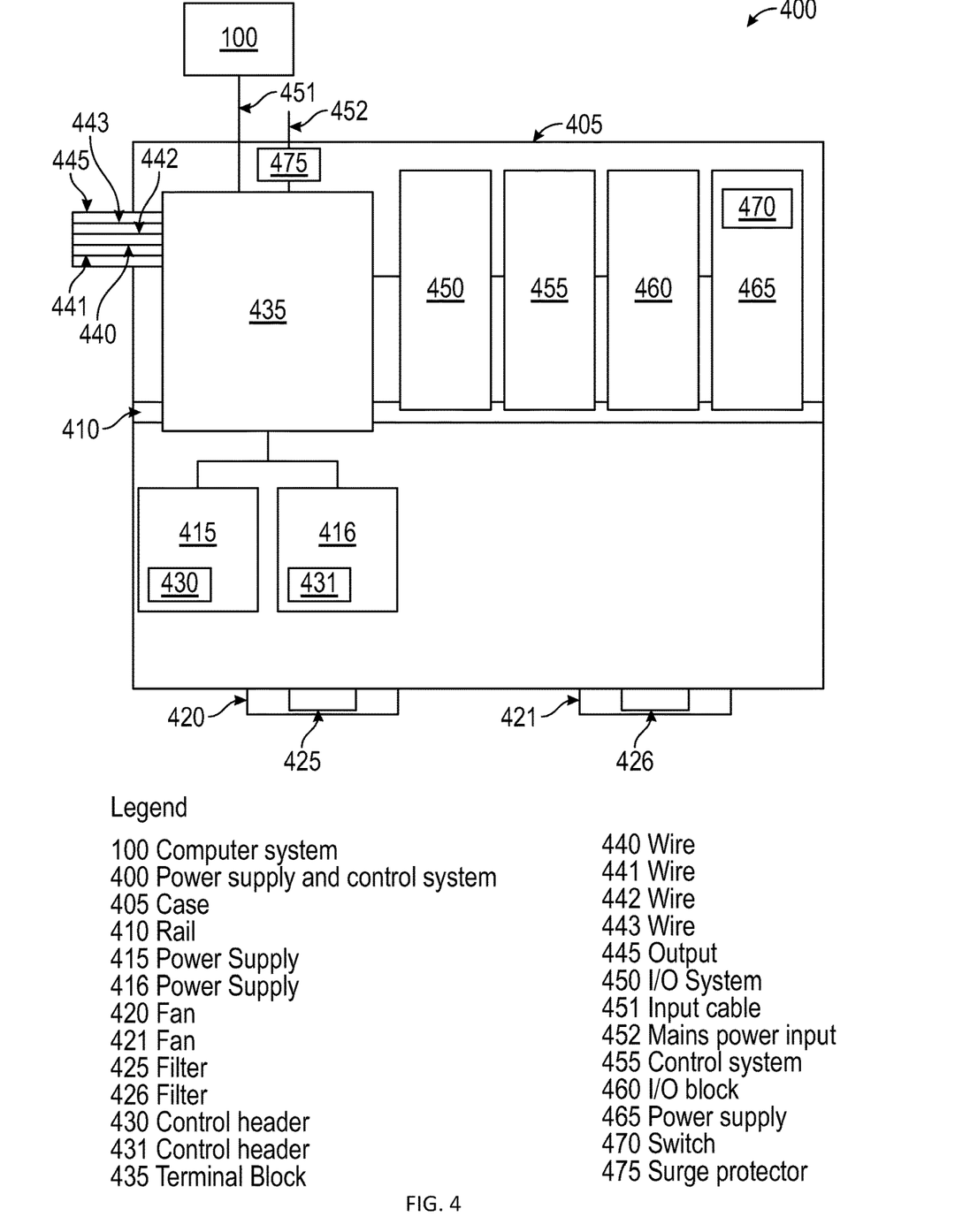
FIG. 4 depicts a control and power system in accordance with the disclosed embodiments.

In an embodiment, a system and method for power supply and control 400 is illustrated. The system 400 can include a case 405. In general, case 405 comprises a metal case configured to house electronic components. A rail 410 can be incorporated in case 405, with standardized connection points for connection with various sub-components of the system 400. The case 405 can be fitted with fans 420 and 421, and filters 425 and 426, and additional fans if necessary, to cool and condition the air in the case 405.

The case 405 houses a set of independent power supplies 415-416. In an embodiment, independent power supplies 415-416 can be configured to provide up to 2000 watts at up to 58 volts. It should be appreciated that in other embodiments, more or fewer power supplies, essentially equivalent to those illustrated in FIG. 4 can be employed, without departing from the scope of the present disclosure. In addition, in other embodiments, the power supply output parameters can be selected according to design considerations. The values provided herein are exemplary.

In still other embodiments, the power supplies 415-416 can be selected to be controllable and/or programmable, such that they can be controlled and programmed using a modular control system as disclosed herein. In certain embodiments, each of the power supplies can be fitted with a respective control header 430-431. The control headers 430-431 provide a control interface for the power supply via connection pins configured therein.

The case 405 can be equipped with apertures for the introduction of power lines and data transmission (i.e. control) input via cabling. In an embodiment, a terminal block 435 configured on or near the rail 410 accepts mains power 452 (e.g. 120 VAC, 220 VAC, etc.) from an external source (e.g. a main power source associated with the facility), along with data input via cable 451. In certain embodiments, the terminal block 435 can comprise multiple terminal blocks according to design considerations. A surge protector 475 can be inserted inline, in case 405. The surge protector 475 can condition incoming power to protect all downstream components from damage in the event of a surge in power.

The terminal block 435 directs the mains power 452 to each of the power supplies 415-416. The outputs from the independent power supplies 415-416 can be combined at terminal block 435.

The system is configured for power conversion from the AC mains power (e.g. 120-277 VAC) to low voltage DC power for distribution to a set of one or more external devices (e.g. luminaries, switches, sensors, etc.). As a result, in an exemplary embodiment, each power supply 415-416 can produce up to 2000 Watts, at up to 58 volts, the output power available at the terminal block 435 can be 4000 Watts at 58 volts DC, and can be provided as an output from terminal block 435. In an embodiment, the output comprises the combined power from the terminal block 435 provided on two wires, wire 440 and wire 441, within a single cable 445 held at a constant voltage by the power supplies and terminal block 435.

This configuration offers the advantage that if one of power supplies 415-416 malfunctions, fusing in the terminal block 435 or in an individual power supply 415-416, prevents the other respective power supplies 415-416 from also malfunctioning. Furthermore, each power supply 415-416 can be independently turned on and off via control lines connected to its respective control header 430-431.

The rail mounted components can include an I/O system 450 connected to rail 410. The I/O system 450 can comprise, for example, a Phoenix Contact I/O System ICL 191, WAGO-I/O system, or other such I/O system. The I/O system 450 can be modular, and is configured to receive signals from, for example, sensors, or other external devices and interface that input with control systems. The I/O system 450 can operate using BACnet/IP protocol or other such protocol. The I/O system 450 receives external input from an ethernet line (e.g. input cable 451) connected to a controlling computer system such as computer system 100.

Building Automation and Control Networks (BACnet) is a protocol used for communication between control systems and building automation applications. For example, BACnet is used to control lighting systems, heating and cooling systems, emergency alert systems, security systems and the like, in accordance with the embodiments disclosed herein. The BACnet protocol includes protocol services, some of which provide application discovery and others of which provide data sharing. In short, BACnet is protocol for building control. BACnet/IP, in which BACnet is delivered over an IP network, provides a communication protocol to allow automation or control software to communicate over IP with a building application or module, for example an LED light system (or other such building system), and to provide control commands to the system.

In certain embodiments, the I/O system 450 can interface with a computer system, such as computer system 100. The computer system 100 can provide a user interface for providing input to, and receiving information from, the I/O system 450. In certain embodiments the connection between the computer system 100 and the I/O system 450 can be wired only, thus providing a layer of security by requiring a wired connection (e.g. via an Ethernet connection such as cable 451) to modify information provided to, and received from, the I/O system 450. In other embodiments the I/O system 450 can be configured with wireless connection communication capability, such that a remote computer system can communicate wirelessly with the I/O system 450 over a wireless network. The computer system 100 can be used to provide user provisioning capabilities for the systems disclosed herein.

The I/O system 450 can serve as one part of a modular control system. In certain embodiments, the modular control system can also comprise a DALI control system 455 configured for controlling, for example, lighting or other such building systems. In certain embodiments, this could include the 0-10 protocol. The control system can include a serial protocol (e.g. "transmit" and "receive"). For example, two outputs from the DALI control system 455 can be provided, one being a plus control output and the other being a minus control output. The DALI control system 455 can connect to multiple DALI pucks, as further disclosed herein.

The I/O system 450 (e.g. Phoenix Contact I/O System ICL 191) and the DALI control system 455 in combination, can form a BACnet/IP<→DALI bridge because one side of the combination communicates via BACnet/IP while the other communicates via DALI.

The DALI protocol allows a controller to specifically address controlled things. For example, in an embodiment, each light in a warehouse can have a DALI address. The DALI protocol allows the controller to directly communicate serial instructions such as "turn on" and "turn off" to the specifically assigned DALI address (i.e. a specific light). In other embodiments, other components can also be controlled via the DALI protocol.

The system 400 thus includes a single four wire cable 455 output from the metal case. Two wires 442 and 443 in the cable are the outputs from the DALI control system 455, optionally passed through the terminal block 435, for controlling applications, and the other two wires 440 and 441 are power and return lines from the summed power supplies. Thus, the output 445 from the system 400 comprises control signals and significant DC power that can be distributed to external applications (e.g. a series of lights). It should be appreciated that this single cable design along with the large power supply provided from the terminal block, allows the system 400 to serve power, and control, to multiple downline applications, reducing the spider web of cabling necessary for power and control of systems endemic to prior art approaches.

An additional digital I/O block 460 can also be connected to the rail system 410 provided in the case 405. Individual rail mounted blocks (e.g. 450, 455, 460, 465) can be modular components designed to interconnect with one another and to communicate with one another when pressed side-to-side, as is typically the situation when they are mounted on a common mounting rail. The digital I/O block 460 can be used to turn other parts of the system 400 (e.g. the DALI control system 455 and the I/O system block 450) on and off. The digital I/O block 460 can be controlled over IP via I/O block 450. This is useful for resetting various components in the system 400 if they are operating improperly, fail, or simply need a hard reboot for any reason. The control blocks can be used to control the fans and maintain proper operating conditions in the case 405.

A power supply 465 for the various control blocks 450, 455, 460 can also be connected to the rail 410 in the case 405. The power supply 465 provides a separate power source for the various control modules in system 400 and is intended to power the control blocks independently of the summed power supplies. A manual switch 470 can be connected to power supply 465 to provide a manual on/off switch for the power supply 465, and in turn the remaining connected control blocks. It can be advantageous in some situations, such as maintenance or trouble shooting, for the control blocks to be powered while the power supplies are off. The separate supply also shields the control system from mishaps involving power lines 440, 441. Alternative embodiments may power the control blocks 450, 455, 460 from one of the main output supplies such as power supplies 415-416.

The control headers 430-431 (as described above) can be controlled via the I/O system 450, which is to say that they can accept input from the I/O system 450 or digital I/O block 460, and can be used to turn off any combination of power supplies 415-416. Typically, Digital I/O 460 provides binary on/off signals to control block 430-431. This is important because if one of the power supplies 415-416 malfunctions, it can be independently shut down, without affecting the power supply provided by the remaining operational power supplies 415-416. Furthermore, individual supplies can be powered on as needed for supplying addition power, for testing individual supplies, or for failover where a supply is held in reserve in case another supply fails.

Figure 5:
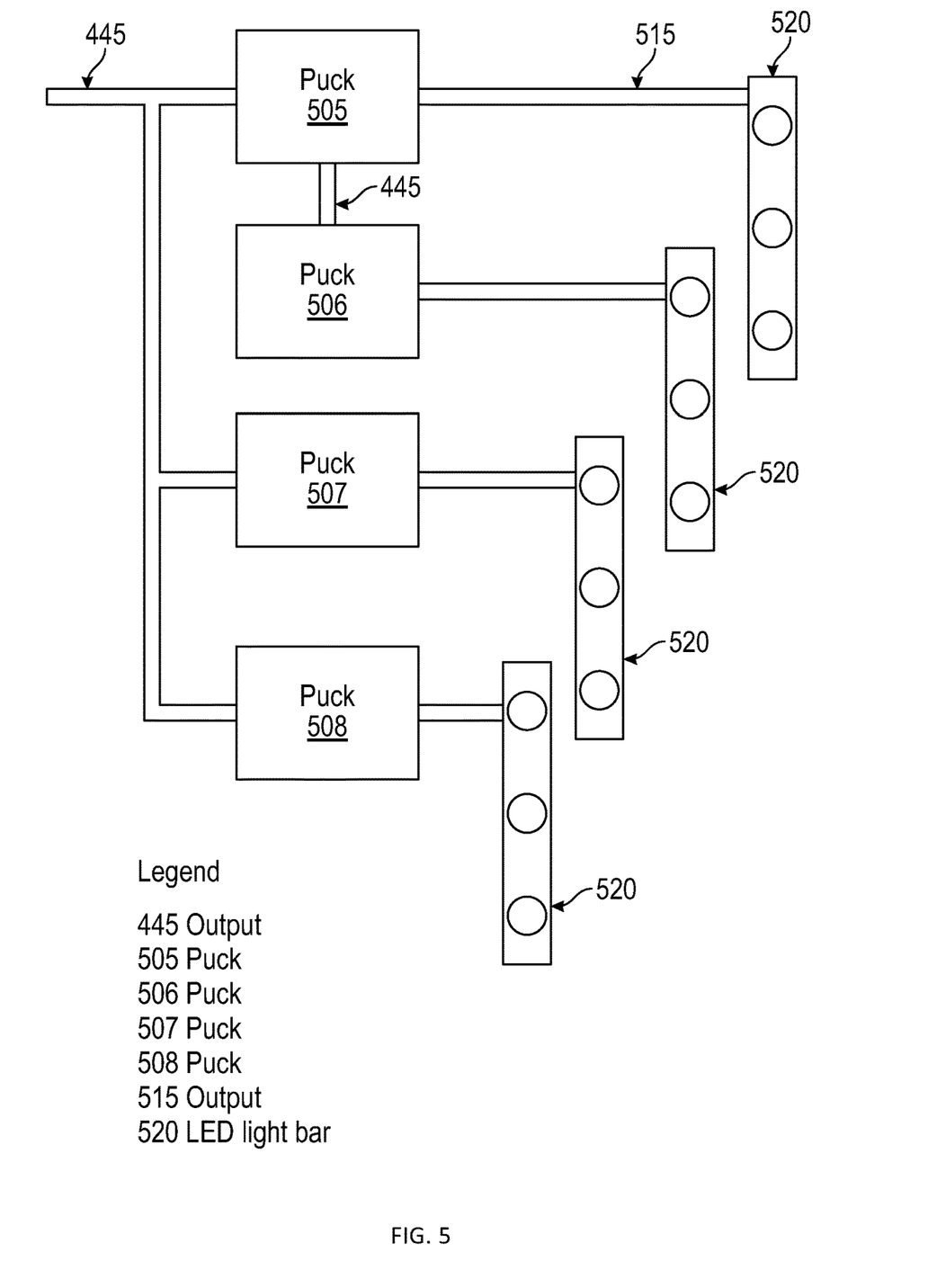
FIG. 5 depicts an embodiment of a distributed set of applications that can be controlled with a control system in accordance with the disclosed embodiments.

FIG. 5 illustrates pucks 505-508. Pucks 505-508 can comprise a circuit configured to provide, among other things, a constant current supply to LED light bars 520. The pucks 505-508 are configured to send and receive control commands in DALI via input cable 445 which provides constant voltage DC power and DALI control signals. Any number of equivalent pucks can be used in other embodiments. Here pucks 505 and 506 are shown daisy chained while pucks 505, 507-508 are using more of a bus topology. Star topologies are created when one puck provides input cables 445 directly to other pucks. In all cases, cable 445 only needs to have four wires, two for power, two for control. The pucks 505-508 can have a voltage rating of, for example 5-58 VDC. The pucks 505-508 can accept input power via input 445. The input power can be any voltage in the rated range and is ideally constant voltage. The output provided via output 515 can be a constant current for driving device, such as an LED bar 520, or other such device.

Pucks 505-508 typically include a CV/CI driver that accepts nominally constant DC voltage (hence the 5-58V DC input range—slow minor fluctuations of the input DC power have negligible effects on the constant current output of the puck). The CV/CI driver is typically controlled by a DALI chip within the puck. Other implementations exist, but conceptually the driver-controller generalization is sufficient for the purposes of this disclosure.

In certain embodiments each device 520 in a facility can be controlled by its own puck 505. For example, each light in a light bar fixture 520 can be controlled by its own puck 505. The puck 505 receives input via input 445 that comprises a voltage, and DALI instruction. If the puck 505 is addressed via the DALI protocol, the puck 505 can initiate a serial command (e.g. turn-on or turn-off the associate LED) and can supply requested current to the LED.

A control interface is required to provide a user control. A computer system, such as computer system 100 can interface with the I/O system 450 via BACnet/IP. The computer system 100 can include a GUI that allows the user to select, control, and or provision the desired application.

For example, in an embodiment, a layout of a warehouse or other such facility can be provided by the GUI. The GUI can provide a status of each light in the warehouse (i.e. whether each light is on, off, dimmed by a percentage, etc.). The GUI can provide controls that allow the user to selectively turn on, turn off, dim, brighten, or change the color temperature of a given light in the warehouse. The GUI can match the controller to an actual physical location in the warehouse. The GUI can further provide provisioning steps where necessary, indicating for example, what controllers exist and where they are in the warehouse.

The computer system 100 can receive input via the GUI 130 and translate the instructions to BACnet/IP. The instructions can be communicated via BACnet/IP to the I/O system 450 via input 451 and optionally terminal block 435. The I/O system 450 is in turn connected to the DALI control system 455. The DALI control system 455 is further connected to the pucks 505-508 via wires 442 and 443 in cable 445. The DALI protocol can be used to instruct the pucks to supply current to a light and turn lights on or off. The system can further be configured via an API running on a remote server in contact with the system 400, allowing mobile clients to interact with the GUI and control the applications in the warehouse.

Figure 6:
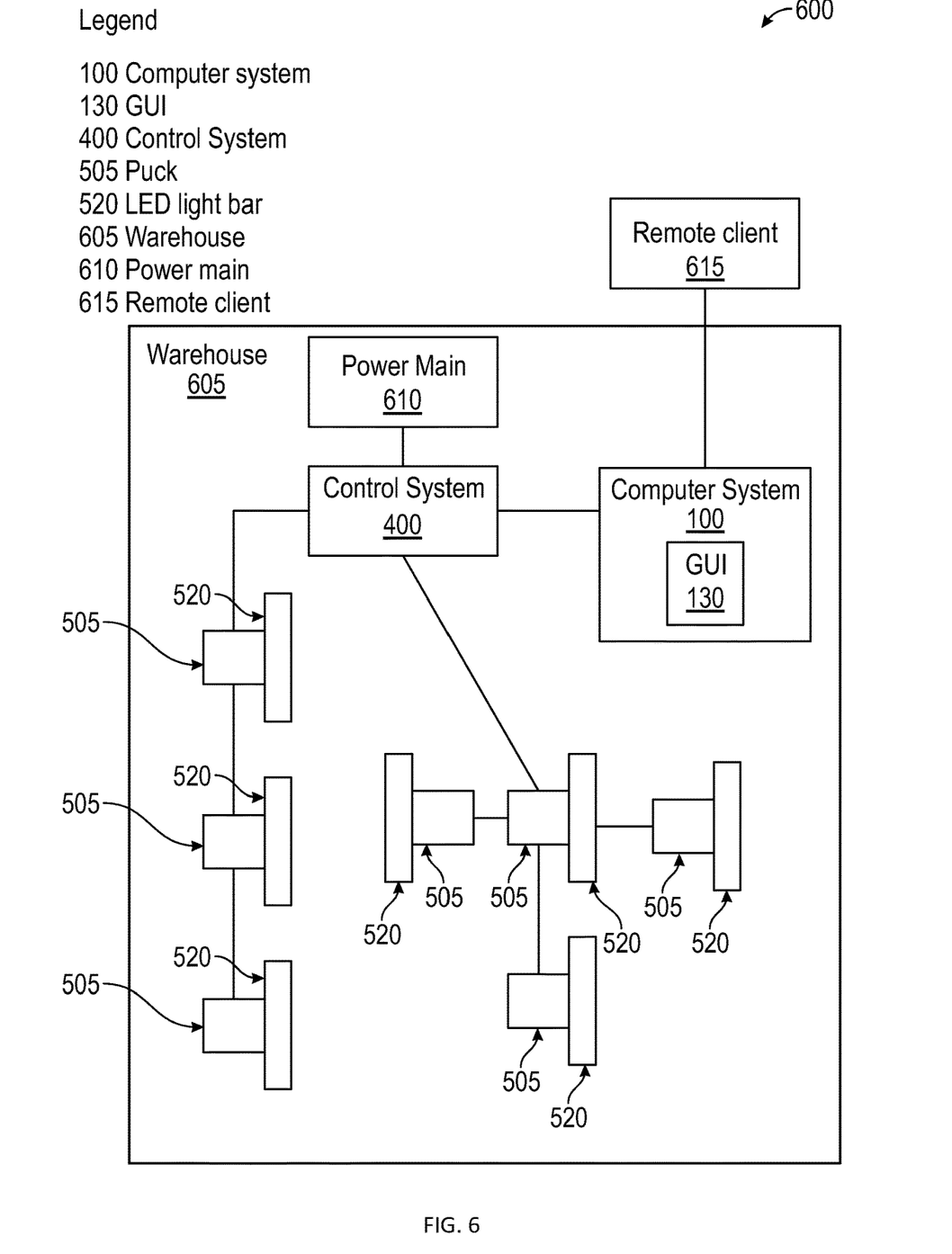
FIG. 6 depicts another embodiment of a control system in accordance with the disclosed embodiments.

FIG. 6 illustrates an exemplary implementation of a control system 600 for a warehouse 605. Mains power can be provided from a power main 610 associated with the warehouse 605 to control system 400 where a summed main power supply is provided to a number of pucks 505. The pucks 505 supply current to each individual device 520 (e.g. LED lighting) in the warehouse 605 and each LED fixture (or fixture element) 520 can be controlled by a GUI 130 associated with computer system 100 or remote client 615. In certain embodiments, the GUI 130 can relate to a browser operating on the computer system 100 that is executing instructions configured in the control system 400. This provides an additional layer of security. The computer system 100 can connect to the control system 400 via wired connection, or wireless connection according to design considerations. Notably, there is no need to specifically configure each device 520, and the relatively high voltage output from control system 400 allows power to be provided a long distance from the control system 400. The DALI protocol provides the ability to control devices 520 that are wired in serial as shown (daisy chained). In other words, the 4-wire cable exiting the system 400 can connect to a first puck 505 which is associated with a first light 520 and can then be output from the puck and connect to the next puck and associated light in the facility, and so on.

DALI provides for discovery of connected devices. During initial system configuration or when a new puck is added, the control system 400 can initiate discovery and obtain a list of every connected puck. Each puck can then be associated with a named light fixture or a location on a map or building schematic.

As further illustrated in FIG. 6, a device star can be provided where one central puck 505 and light 520 can be connected to multiple additional puck and light configurations. These embodiments obviate the need for a dedicated wire from the central control system 400 to each light. It is not required that a puck lie at the center of the star, a terminal block can do the job.

Figure 7:
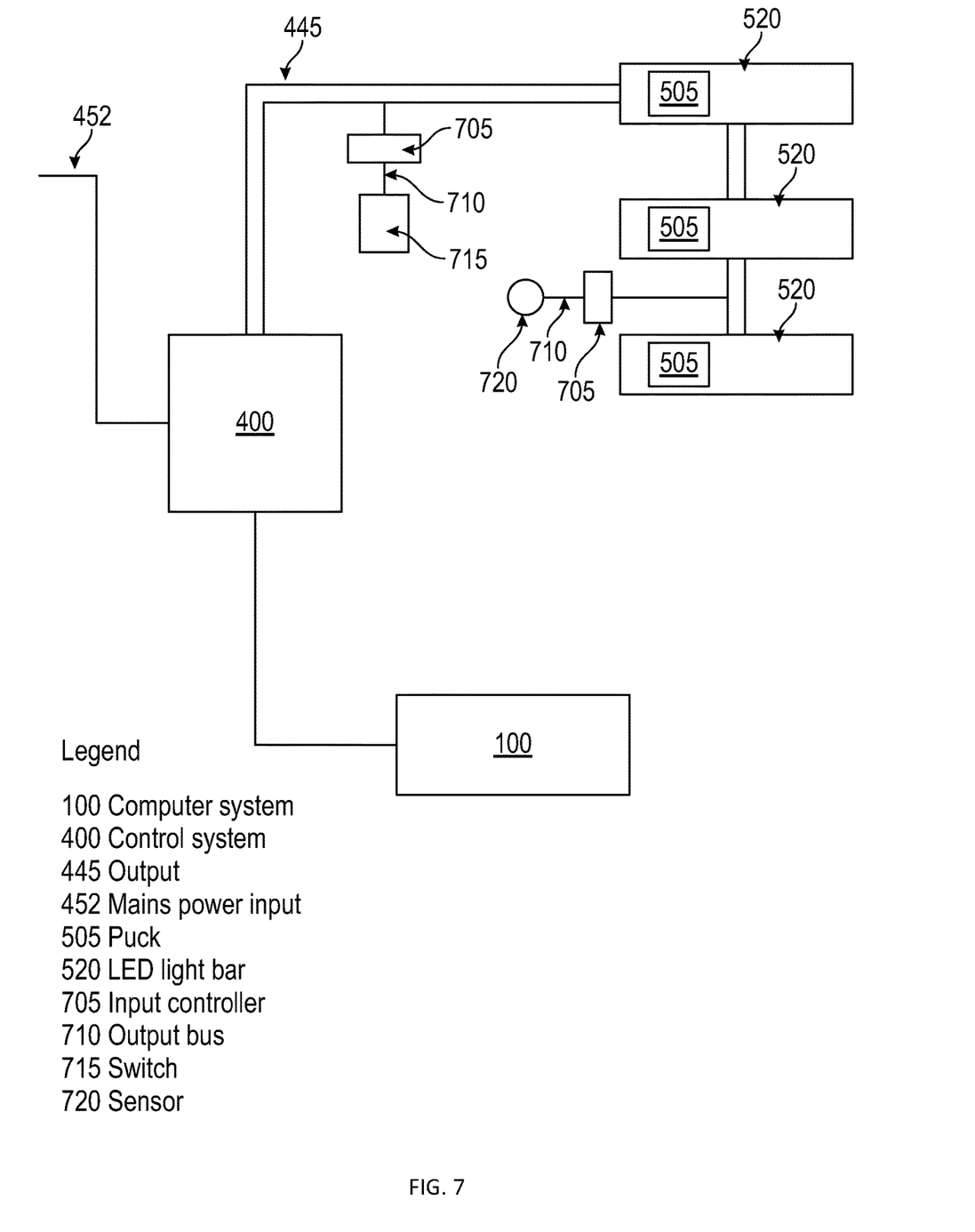
FIG. 7 depicts another embodiment of a control system in accordance with the disclosed embodiments.

FIG. 7 illustrates another embodiment of the invention. In this embodiment mains power is provided to a control system 400 via mains power input 452. It should be understood that the control system 400 can incorporate features as illustrated in FIG. 4.

The control system 400 includes 4-wire cable 445, that provides power and control. The cable 445 connects to input controller 705. The input controller 705 can comprise a DALI input controller (or other such controller). The input controller receives power and control via the wires in cable 445 exiting the control system 400. The input controller 705 can provide DALI control of low voltage device 715, which can be any device, including a switch, sensor, or other such device. The input controller 705 can be powered via a bus 710. That is to say, the input controller 705 includes an output bus 710, that can be configured as a DALI bus, or other such bus, wherein power and control are all provided in the single line.

In embodiments, where the device 715 comprises a switch. The input controller 705 is connected to the switch 715, which can be embodied as an LV switch or other such switch. In certain embodiments, the switch 715 can comprise a push button switch. The push button switch can be manipulated to control downline devices via the DALI protocol.

In other embodiments, the switch 715 can comprise a smart switch. The smart switch can comprise a capacitive touch panel with a glass, or other such touch display. The switch 715 can be configured to provide control of luminaires using the DALI standard and can be powered via the DALI bus 710. Thus, in certain embodiments, the device 715 can serve as a master switch to turn all downline applications on or off. It should be appreciated that multiple input controls 705 and switches 715 may be used in various design topologies.

The cable 445 can be further connected to one or more downline applications 520. In the embodiment, disclosed in FIG. 7, three downline applications 520 are illustrated, each of which can comprise, for example, a luminaire, equipped with a puck 505. The cable 445 is connected to each application such that power is supplied to the application, along with a connection for control via the control system 400.

The cable 445 can further connect to a second input control 705 connected via bus 710 to a sensor 720. The sensor 720 can comprise a motion sensor, light sensor, etc. the input controller 705 can receive input from the sensor 720 and use the received input to control the one or more of the applications 520, such as luminaires. It should be appreciated that multiple input controls 705 and sensors may be used in various design topologies.

It should finally be appreciated, that the system can be controlled via computer system 100, equipped with a user interface, as disclose herein, that allows a user to provision and control one or more of the applications 520, input controllers 705, switches 715, and sensors 720, with control system 400.

Figure 8:
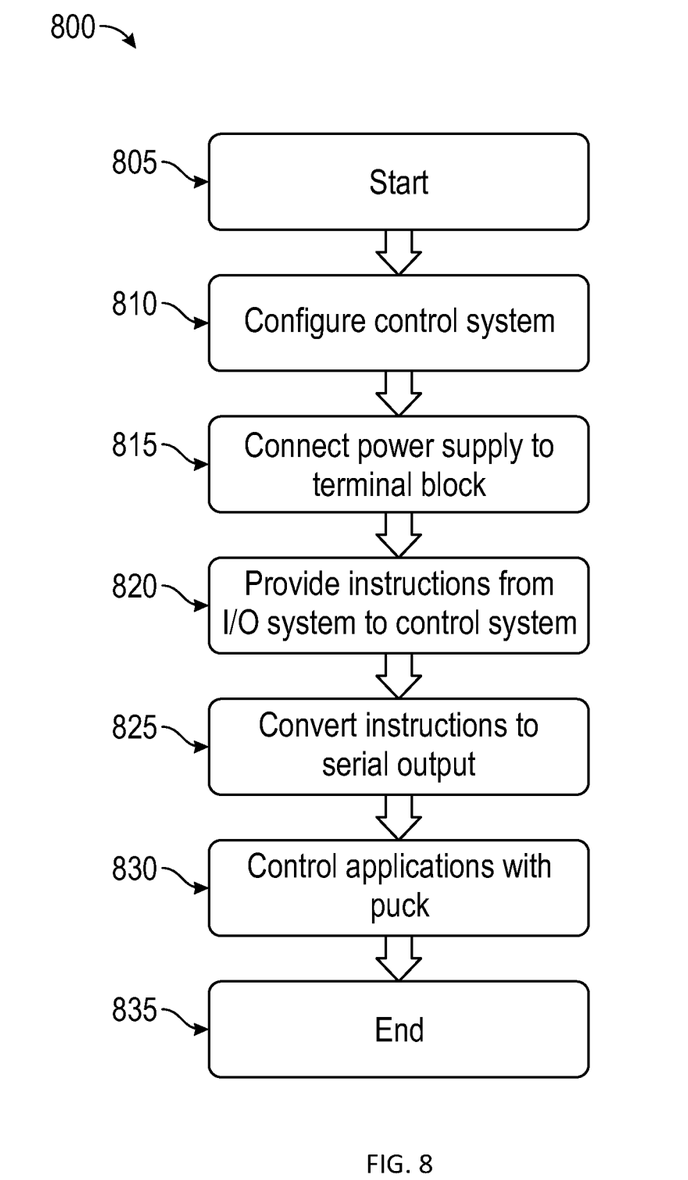
FIG. 8 depicts a flow chart illustrating steps associated with a method for controlling and providing power to a set of applications in accordance with the disclosed embodiments.

FIG. 8 illustrates a method 800, for controlling and providing power to a system of applications in accordance with the disclosed embodiments. The method starts at 805.

At block 810 the control system 400 can be configured as illustrated in the embodiments presented herein. The power supply is provided from a terminal block which can be connected to one or more power supplies, as illustrated at block 815 so that the terminal block is ready to provide power to downline applications.

Instructions can be provided, as shown at block 820, to an I/O system from a control system. The instructions provided to the I/O system can be converted to a serial output as shown at 825, with the control block connected to the I/O system. Once the instructions are converted, downline applications (e.g. a luminaire) can be controlled as shown at step 830, via a puck which accepts the serial instructions. The puck is configured to receive power from the terminal block, process the serial output, and output a current to the associated application. The method ends at step 835.

Figure 9:
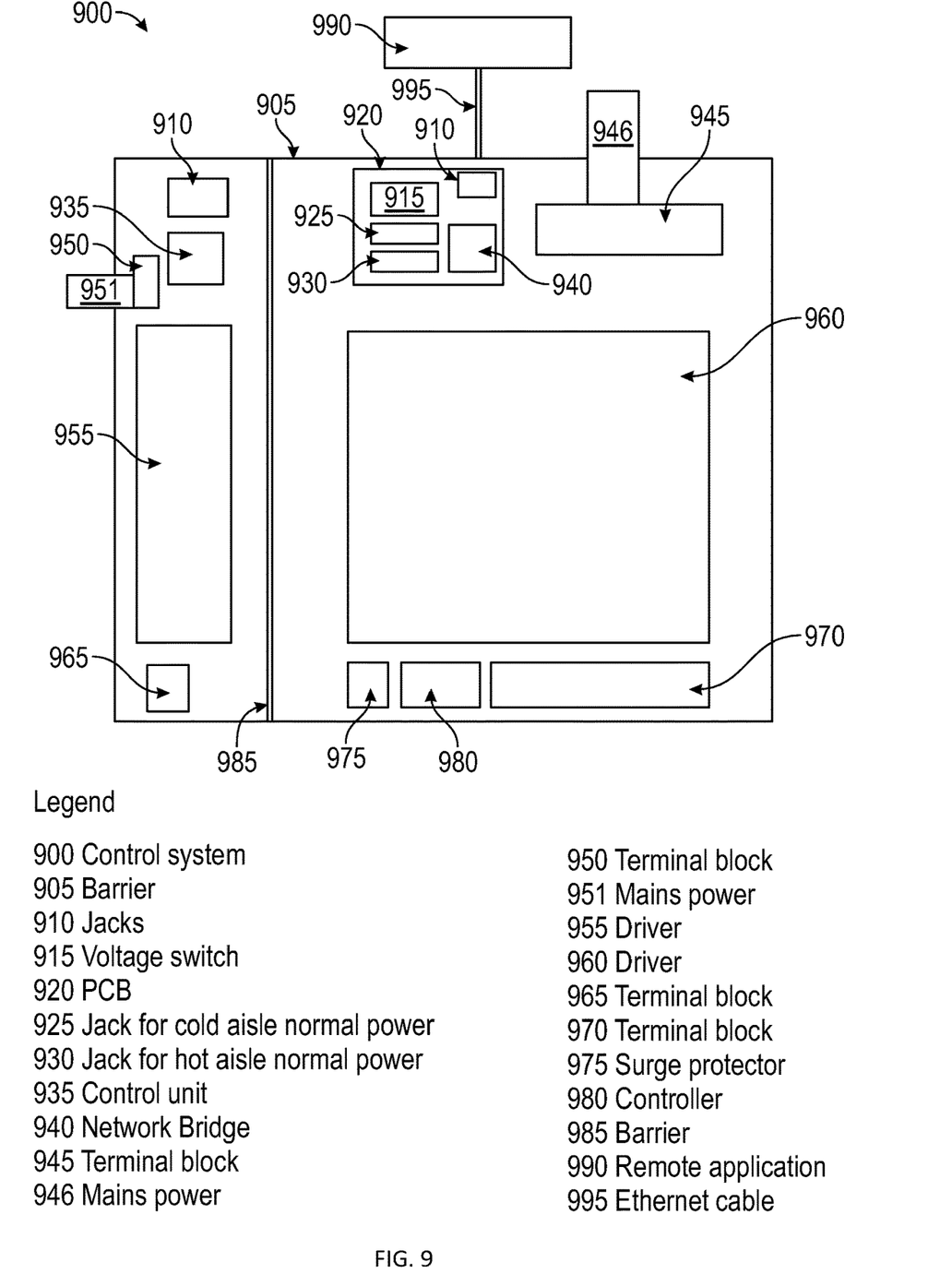
FIG. 9 depicts another embodiment of a control system in accordance with the disclosed embodiments.

FIG. 9 illustrates an alternative embodiment of a lighting control system 900, in accordance with the disclosed embodiments. The lighting control system 900 is configured to provide remote AC to DC power conversion, and can be used to convert alternating current input power (for example 120-277 VAC) to a low voltage DC output, which enables reliable distribution to remote applications, such as dimmable LEDs.

As illustrated in FIG. 9, the lighting control system 900, comprises a standard case 905. Case 905 can comprise a metal case configured to house electronic components. A barrier 985 can be configured in the case 905 to separate emergency and normal power sides of the system 900. The barrier 985 can comprise an 18 gauge (or other necessary strength) galvanized steel barrier. A rail can be incorporated in case 905, with standardized connection points for connection with various sub-components of the system 900. The case 905 can include one or more knockouts for the introduction of power cables, ethernet cables, and other such cables. In certain embodiments, the case 905 can be fabricated from steel with louvered back and side panels.

The case 905 can house jacks 910 for cold aisle emergency fixtures. A low voltage switch 915 is provided on PCB 920, along with a jack for cold aisle normal power 925, and a jack for hot aisle (non-emergency) power 930. The PCB 920 is connected to digital network bridge 940. Digital network bridge 940 provides a network connection between one or more network devices. The digital network bridge 940 serves as a means for connecting network connected devices which can then be managed remotely. Thus, in certain embodiments, remote control of applications 990 can be accomplished with the system 900. A standard emergency lighting control unit 935 (e.g. a "Wattstopper") can be included in the case 905 and is configured to provide control of emergency application sand normal applications (e.g. lighting) in the environment in which the applications are disposed.

AC mains power can be routed through terminal block 945 which is configured to handle normal power, and terminal block 950 to handle emergency power. Separate mains power 946 and mains power 951 can be provided to the terminal block 945 and terminal block 950 respectively. As such, terminal block 945 can be connected to the components on PCB 920 and controlled by switch 910 via driver 960, which serves as the application driver for normal power operations. Likewise, driver 960 serves as the driver for emergency power operations.

Terminal block 965 serves as the terminal block for the low voltage emergency circuit. Terminal block 970 serves as a terminal block for the low voltage normal power circuit. A surge protector 975 can be provided inline to prevent damage to the downline components.

A controller 980, which can be, for example, a Wattstopper LMRC-112 series room controller, can be connected to the terminal block 970. The controller 980 includes relays to switch a current. An alternating power supply, with multiple outputs per relay is provided for control of one or more application 990, including but not limited to, dimmable LEDs and associated drivers.

The system 900 can thus be used to provide control and power to remote power over ethernet (PoE) application (e.g. application 990), which can include dimmable LED luminaires. Specifically, ethernet cable 995 can be provided from case 905 to one or more applications 990. Instructions for control of the application 990 can be provided via a remote device connected to a network.

The system 900 enables simple, cost-effective lighting installations and reduces the need for thermal management at the fixture. The system 900 provides individual power and programmable drive current for as many as 14 applications (e.g. LED drivers).

Based on the foregoing, it can be appreciated that a number of embodiments, preferred and alternative, are disclosed herein. It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein may be subsequently made by those skilled in the art which are also intended to be encompassed by the following claims.

What is claimed is:
1. A system comprising:
a normal power side and an emergency power side;
a barrier separating the normal power side and the emergency power side;
a normal mains AC power input configured to accept 120-277 volts AC;
a plurality of power supplies, wherein the plurality of power supplies can provide a total power from 0 Watts to 4000 Watts;
at least one normal power supply driver configured on the normal power side;

at least one emergency power supply driver configured on the emergency power side;
a terminal block operably connected to the normal mains AC power input;
a control block configured to control at least one application;
an emergency lighting control unit configured to provide control of emergency applications; and
a cable output, wherein the system can provide control and DC power at constant current, to the at least one application via the cable.

2. The system of claim 1 wherein power that is output from each of said plurality of power supplies is summed at said terminal block.

3. The system of claim 2 wherein said control block comprises an LMRC-112 series Wattstopper®.

4. The system of claim 1 wherein the barrier separating the normal power side and the emergency power side further comprises:
a galvanized steel barrier.

5. The system of claim 3 further comprising:
a housing; and
a rail configured in said housing, said rail configured to hold said control block.

6. The system of claim 5 wherein the system further comprises:
a digital network bridge configured to provide a network connection to network connected devices.

7. The system of claim 1 wherein said at least one application further comprises:
a switch connecting the terminal block to the at least one normal power supply driver.

8. The system of claim 1 wherein the cable output is configured to supply DC, power at constant current to at least one luminaire.

9. The system of claim 8 wherein the at least one luminaire comprises a dimmable light emitting diode.

10. A method comprising:
connecting at least one power supply to a terminal block in a system comprising: a normal power side and an emergency power side, a barrier separating the normal power side and the emergency power side, at least one normal power supply driver configured on the normal power side, and at least one emergency power supply driver configured on the emergency power side;
providing control instruction to an I/O system;
converting said control instructions provided to said I/O system to an output with a control block connected to said I/O system;
providing DC power at constant current to a luminaire;
controlling the luminaire connected to said serial output.

11. The method of claim 10 wherein said at least one power supply comprises a plurality of power supplies, said method further comprising:
summing said output from each of said plurality of power supplies at said terminal block, wherein said summed power comprises a total power of 0 Watts to 4000 Watts.

12. The method of claim 10 further comprising:
controlling emergency lighting with an emergency lighting control unit.

* * * * *